(12) United States Patent
Wang et al.

(10) Patent No.: US 11,247,708 B2
(45) Date of Patent: Feb. 15, 2022

(54) FOLDING WAGON

(71) Applicant: Ningbo Matrix Trading Co., Ltd., Ningbo (CN)

(72) Inventors: Wenjie Wang, Ningbo (CN); Zhengming He, Ningbo (CN); Libo Song, Ningbo (CN)

(*) Notice: Subject to any disclaimer, the term of this patent is extended or adjusted under 35 U.S.C. 154(b) by 0 days.

(21) Appl. No.: 16/281,037

(22) Filed: Feb. 20, 2019

(65) Prior Publication Data
US 2020/0207392 A1 Jul. 2, 2020

Related U.S. Application Data

(60) Provisional application No. 62/785,376, filed on Dec. 27, 2018.

(51) Int. Cl.
  *B62B 3/02* (2006.01)
  *B62B 3/00* (2006.01)

(52) U.S. Cl.
  CPC ........... *B62B 3/02* (2013.01); *B62B 3/001* (2013.01); *B62B 3/007* (2013.01); *B62B 2205/06* (2013.01); *B62B 2205/26* (2013.01)

(58) Field of Classification Search
  CPC ........... B62B 3/001; B62B 3/007; B62B 3/02; B62B 2205/06; B62B 2205/26
  See application file for complete search history.

(56) References Cited

U.S. PATENT DOCUMENTS

| | | | |
|---|---|---|---|
| 9,145,154 B1* | 9/2015 | Horowitz | B62B 7/008 |
| 9,855,962 B1* | 1/2018 | Chen | B62B 5/067 |
| 2003/0025301 A1* | 2/2003 | Banuelos, III | B62B 3/007 280/651 |
| 2010/0090444 A1* | 4/2010 | Chen | B62B 3/007 280/651 |
| 2015/0035258 A1* | 2/2015 | Chen | B62B 3/007 280/651 |

\* cited by examiner

*Primary Examiner* — Bryan A Evans
(74) *Attorney, Agent, or Firm* — WPAT Law, P.C.; Anthony King

(57) ABSTRACT

A folding wagon allowing a user initiate a folding action by pressing or stepping down on a lever disposed on the front end, the rear end, or both ends of the folding wagon.

15 Claims, 9 Drawing Sheets

FOLDING WAGON

CROSS-REFERENCE TO RELATED APPLICATIONS

This application claims priority to, and is a non-provisional of, U.S. Provisional Pat. No. 62/785,376, filed on Dec. 27, 2018, which is hereby incorporated by reference in its entirety.

FIELD OF THE DISCLOSURE

The field of the disclosure is a hand truck or a folding wagon.

BACKGROUND OF THE DISCLOSURE

There exists many folding wagons in the prior art. There is a continuing need for better and easier ways to fold a wagon.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
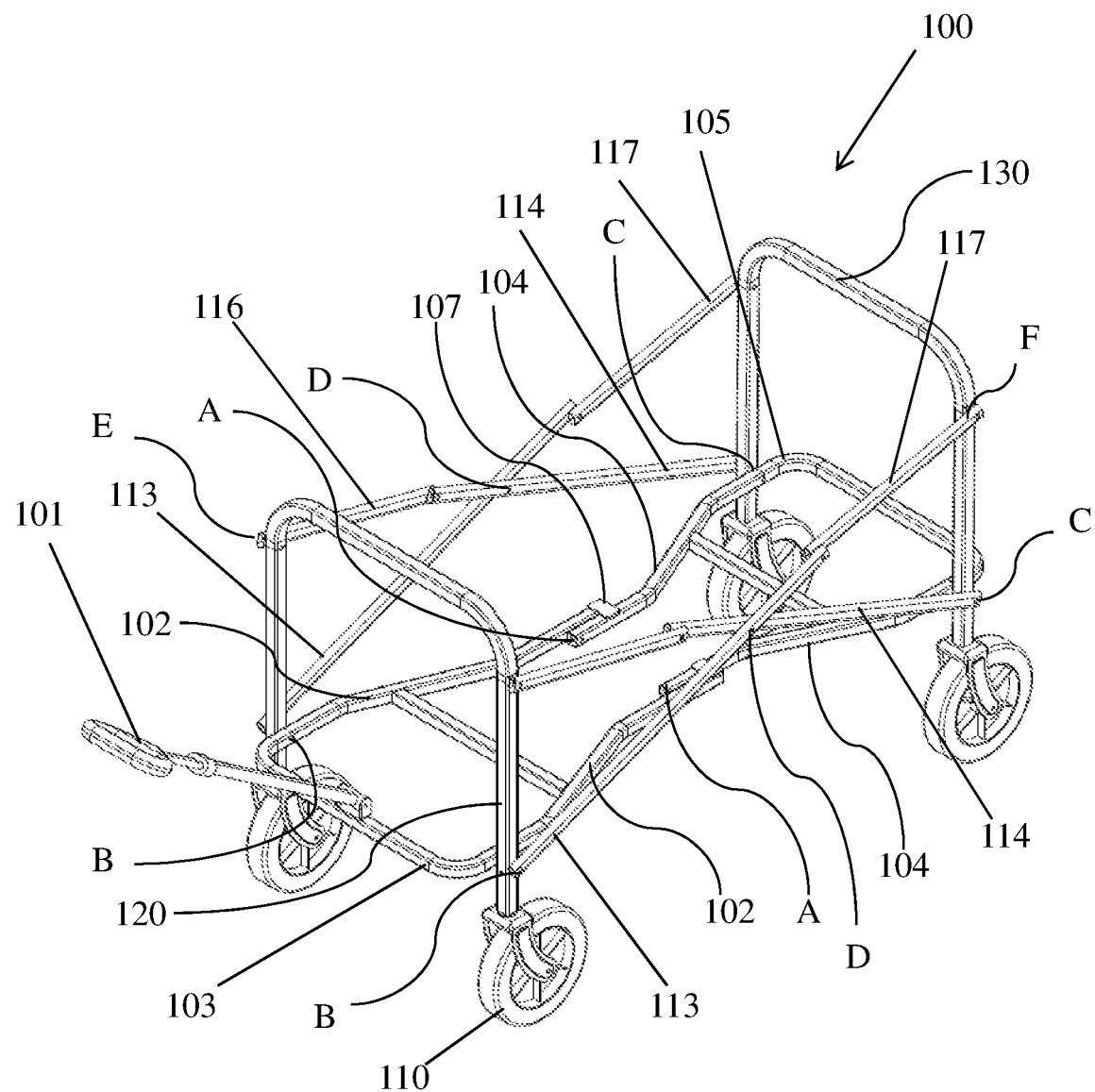
FIG. 1 is a perspective view of one embodiment of the scaffold of a folding wagon according to an aspect of the embodiment.

The following call out list of elements in the drawing can be a useful guide when referencing the elements of the drawing figures:
100 Folding wagon
101 Handle
102 Front bottom frame
104 Rear frame
107 Stopper
110 Wheel
112 Triangular structure
113 First transverse frame
114 Second transverse frame
116 Front extender
117 Rear extender
120 Front vertical support
130 Rear vertical support
132 Rear upright standard
134 Rear horizontal brace
200 Folding wagon
201 Handle
202 Front bottom frame
204 Rear frame
207 Stopper
300 Folding wagon
301 Handle
302 Front bottom frame
304 Rear frame
307 Stopper
A Pivot A
B Pivot B
C Pivot C
D Pivot D
E Pivot E
F Pivot F

BRIEF SUMMARY OF THE DISCLOSURE

The inventors have discovered a novel folding wagon apparatus and a novel method of folding a wagon. In a general embodiment, the folding wagon includes a front frame and a rear frame pivotably coupled to the front frame at a pivot A. There can be a handle coupled to the front frame allowing a user to pull and maneuver the wagon.

There can be some kind of stopper mechanism or stopper structure coupled to either the front frame or to the rear frame. The purpose of the stopper is to restrict a pivoting movement of the front frame relative to the rear frame in at least one direction.

There can be a plurality of wheels coupled to the front frame and/or the rear frame.

There can be a first transverse frame pivotably coupled to the front frame at pivot B. Additionally, there can be a second transverse frame pivotably coupled to the rear frame at pivot C.

In one contemplated embodiment, the first transverse frame can be pivotably coupled to the second transverse frame at a pivot D.

In a further contemplated embodiment, the folding wagon can have a front vertical support and a rear vertical support, wherein pivot B is disposed on the front vertical support and pivot C is disposed on the rear vertical support.

The front frame and the rear frame can be arranged in a number of locations, in different ways of construction. For example, the front frame and the rear frame can be disposed under a cargo area of the wagon.

In yet another contemplated embodiment, the front frame can be pivotably coupled to the front vertical support and the front frame can have a front end that extends beyond pivot B and beyond the front vertical support.

Similarly, the rear frame can be pivotably coupled to the rear vertical support and the rear frame can have a rear end that extends beyond pivot C and beyond the rear vertical support.

In one embodiment, the rear frame can be pivotably coupled to the rear vertical support at pivot C.

In one particular aspect of an embodiment, the first transverse frame can have a unfoldable section defined by a length between pivot B and pivot D, and the second transverse frame can have an unfoldable section defined by a length between pivot C and pivot D.

The first transverse frame can be coupled to the rear vertical support at a pivot F via a rear extender which can be pivotably coupled to the first transverse frame. Likewise, the second transverse frame can be coupled to the front vertical support at a pivot E via a front extender which can be pivotably coupled to the second transverse frame.

In one aspect of the contemplated embodiments, the front frame can be unfoldable along a length between pivot B and pivot A, and similarly the rear frame can be unfoldable along a length between pivot A and pivot C.

In still yet another contemplated embodiment is a scaffold for a folding wagon, wherein the scaffold can have a front frame pivotably coupled to a rear frame with a range of motion no greater than 180 degrees. There can be a first transverse frame can be coupled to the front frame at pivot A, and a second transverse frame pivotably coupled to the rear frame. The first transverse frame can be pivotably coupled to the second transverse frame at pivot D.

In one embodiment, both the first transverse frame and the second transverse frame can be diagonally disposed on a side of the wagon when the scaffold is in a fully expanded state.

In still yet another contemplated embodiment, wherein in a fully expanded state, the front frame and the rear frame creates a straight and flat bottom frame which forms the bottom side of an isosceles triangle structure when looking at the scaffold laterally. The first and second transverse frames become the two equal sides of the isosceles triangle structure.

In another embodiment, the front frame can be pivotable at pivot B near a front end of the wagon, the front frame has a front end that extends forward beyond the pivot B, wherein a downward biasing force applied on the front end causes the straight and flat bottom frame to fold and collapse.

In yet another embodiment, a front vertical support and/or a rear vertical support is/are not present, so long as pivot B and pivot C are properly supported.

Pivot B is contemplated to be supported by various ways. When pivot B is properly supported, a user may apply a downward biasing force onto the front end of the front frame to cause the pivot A to elevate above pivot B, thereby decreasing a pivoting angle at pivot A.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

DETAILED DESCRIPTION

A number of implementations will be described below. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the claims at the end of the instant disclosure.

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

Referring now to FIG. 1 which shows one embodiment of the instant disclosure. This one embodiment basically shows a folding wagon 100 without an associated enclosure fabric, or enclosure canvas. In other words, for purposes of easy illustration, what's shown in FIG. 1 is a scaffold for a folding wagon 100 where its enclosure fabric is removed. One of ordinary skill in the art would immediately recognize how a fabric or an enclosure canvas could or should fit onto the scaffold.

In FIG. 1, folding wagon 100 can have a handle 101 allowing a user to grab onto, which allows the user to steer the wagon. The handle 101 can be attached to a front end of the folding wagon 100. Also contemplated is for the handle 101 to be attached to a rear end of the folding wagon 100.

In other embodiments, the handle 101 may be attached to other parts of the folding wagon 100, such as being pivotably attached to a part of the front vertical support 120.

There can be a front frame 102 pivotably coupled to a rear frame 104. In one embodiment, the front frame 102 and rear 104 can form a bottom chassis that is located at the bottom side of the wagon. As shown in FIG. 1, this bottom chassis can be disposed under the cargo area. In other words, the chassis can form a platform to hold the weight of a cargo.

In other embodiments, this chassis formed by front frame 102 and rear frame 104 can be arranged in other ways other than being a bottom platform. For example, the front frame 102 and rear frame 104 can be disposed higher from the bottom side, and they can be disposed on both lateral sides of the folding wagon 100 and being pivotably connected to each other. In a further embodiment, they can even be disposed on the top end of the folding wagon 100. In yet another embodiment, they can be disposed in the center of the folding wagon 100. There are various ways to arrange the front frame 102 and the rear frame 104, so long as they are pivotably coupled to each other and act as a main chassis for the folding wagon.

Figure 2:
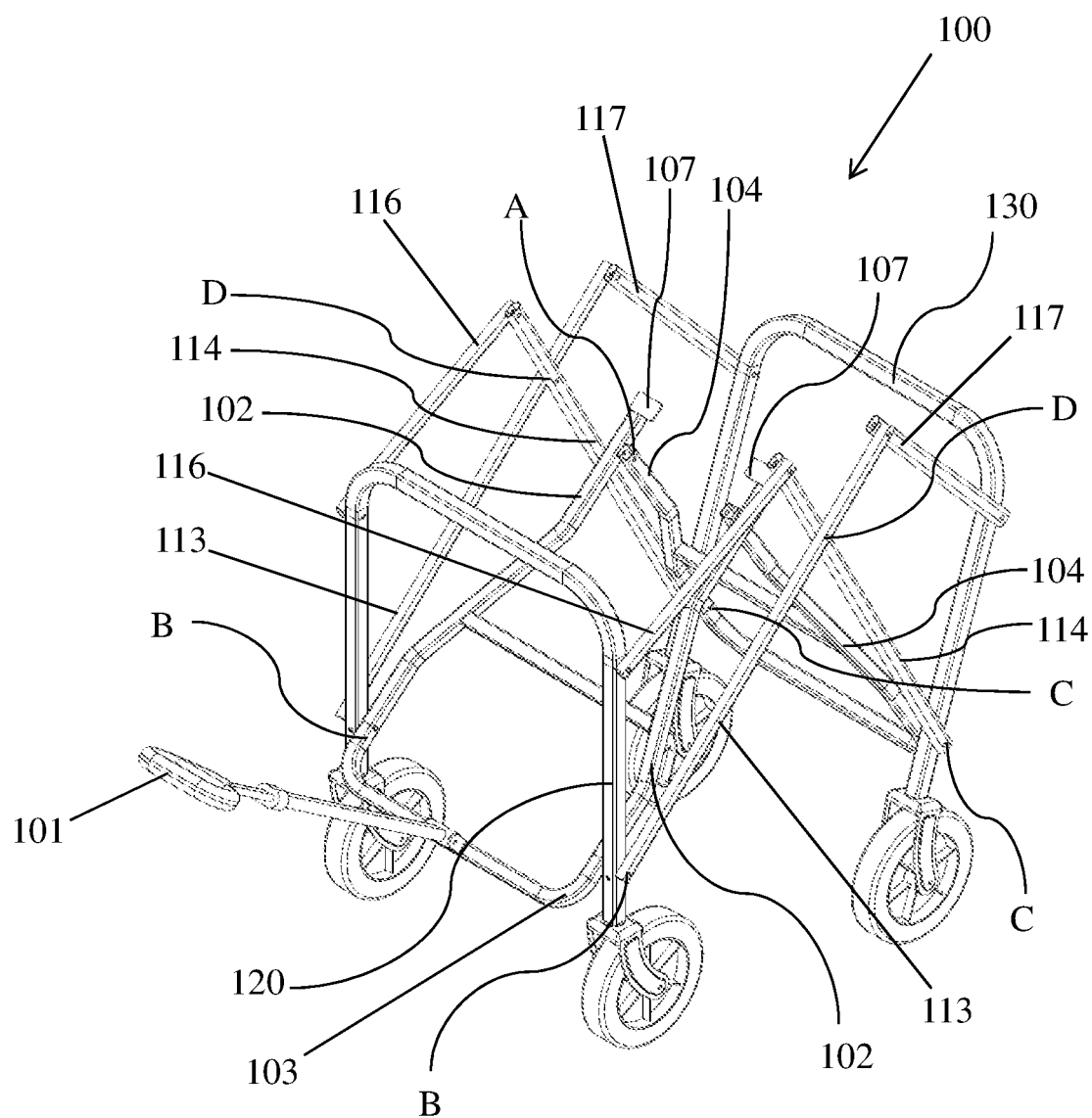
FIG. 2 is a perspective view of the scaffold of FIG. 1, being half-way folded.
Figure 3:
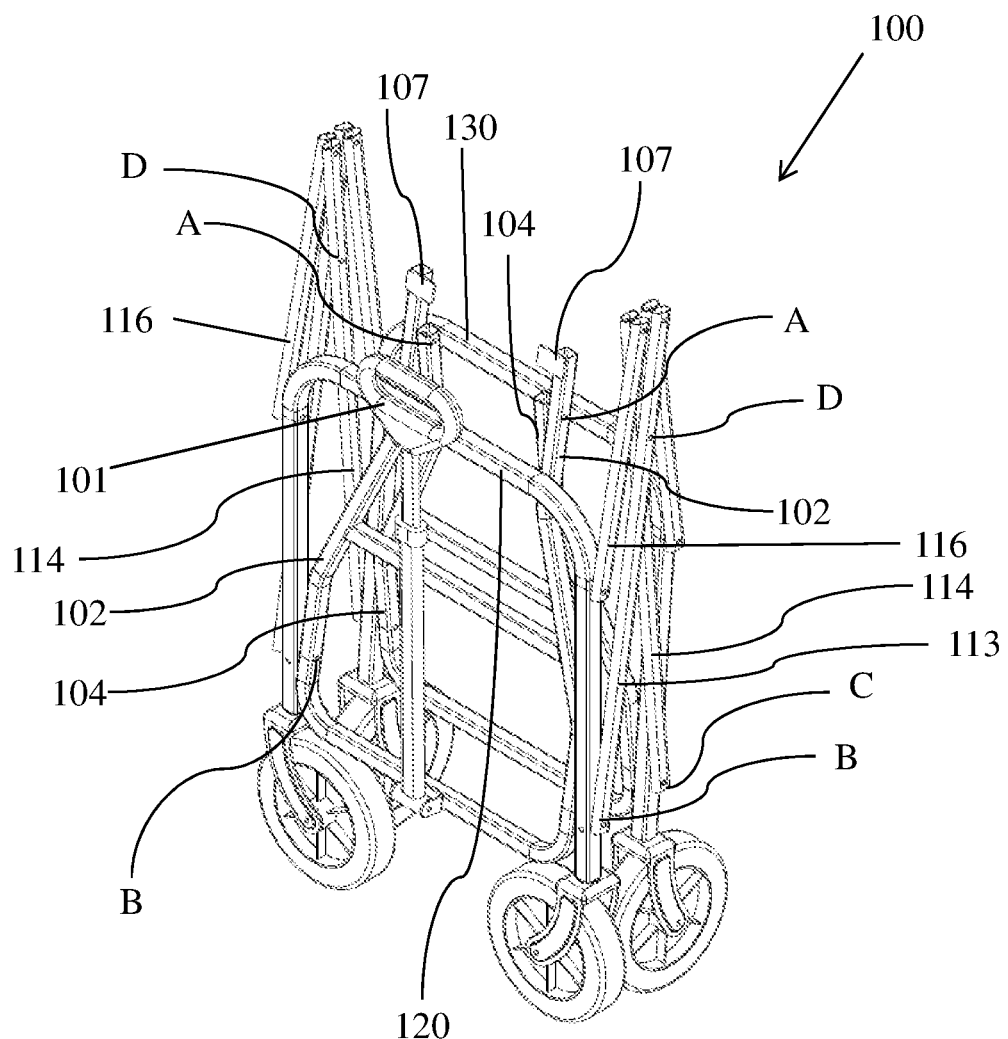
FIG. 3 is a perspective view of the scaffold of FIG. 1, being fully folded.
Figure 4:
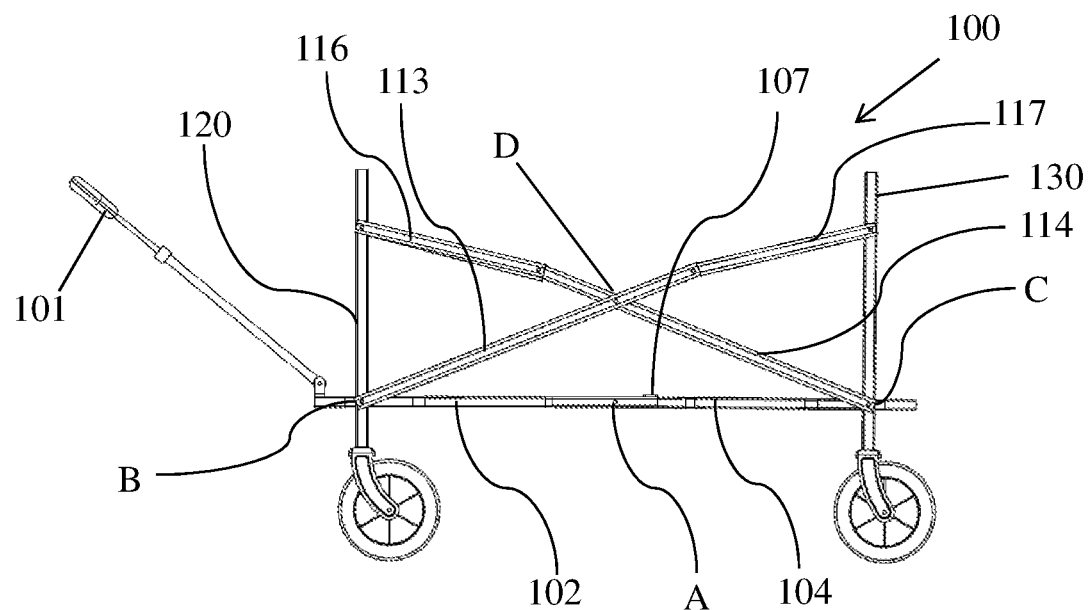
FIG. 4 is a side view of the scaffold of FIG. 1.

In one aspect of the disclosure, the front frame 102 and rear 104 are pivotably connected and its pivoting action can be user-actuated. This means a user may initiate the pivoting/folding action of front frame 102 and rear frame 104 which happens at pivot point A. When a user initiates this folding/pivoting action (as shown in FIG. 2), the rest of the wagon scaffolding also folds at appropriate places, eventually collapsing in to a folded state (as shown in FIG. 3).

In one embodiment, a user can initiate the pivoting/folding action by applying a downward force onto a front end 103 of the front frame 102. Applying a downward force onto the front end 103 can cause front frame 102 to pivot about a pivot point B. When front frame 102 rotates about pivot B, it causes corresponding pivoting action at pivot A. Referring to FIG. 2, when front end 103 moves in a downward direction, the opposite end of the front frame 102 moves in an upward direction, essentially elevating pivot A vertically.

In one contemplated embodiment, the front end 103 of front frame 102 extends forward beyond pivot B as shown in FIG. 1.

In another embodiment, a user may initiate the pivoting/folding action by applying a pulling force on or near pivot A. For example, there can be a pull string attached to or attached near pivot A, and a user may hold the pull string and pull it vertically upward. By pulling it upward, pivot A can elevate vertically, which causes front frame 102 and rear frame 104 to pivot/fold about pivot A.

In yet another embodiment, no such pull string is provided and the user may initiate the pivoting/folding action only by applying a down force (e.g., stepping on it) onto the front end 103 of front frame 102.

Similarly in other embodiments, the rear frame 104 can pivot about a pivot point C. In such embodiments, a user can initiate the pivoting/folding action by applying a downward force onto a rear end 105 of the rear frame 104. Applying a downward force (e.g., stepping on it) onto the rear end 105 can cause the rear frame 104 to pivot about a pivot point C. When the rear frame 104 rotates about pivot C, it causes corresponding pivoting action at pivot A. Referring to FIG. 2, when rear end 105 moves in a downward direction, the opposite end of the rear frame 104 moves in an upward direction, essentially elevating pivot A vertically.

In one contemplated embodiment, the rear end 105 of rear frame 102 extends rearward beyond pivot C as shown in FIG. 1.

In one aspect of the embodiments, pivot A only allows the front frame 102 and rear frame 104 to fold towards each other in a downward direction, thereby allowing a decreasing angle on the bottom side of the pivot A. This would not allow the angle on the top side of the pivot A to decrease.

To permit pivot A to fold only in a certain direction, a stopper can be provided. In FIG. 1, stopper 107 in the configuration of a short flat plate is disposed on the top side of a distal end of front frame 102. Stopper 107 causes the pivoting range of pivot point A to be limited to no more than 180 degrees. In FIG. 1, front frame 102 and rear frame 104 forms a relatively straight and flat chassis, essentially having 180 degrees at pivot A. In FIG. 2, the bottom angle at pivot A is decreased to less than 180 degrees. In FIG. 3, the bottom angle at pivot A is further decreased. The stopper 107 prevents the bottom pivoting angle at pivot A from going above 180 degrees.

Figure 10:
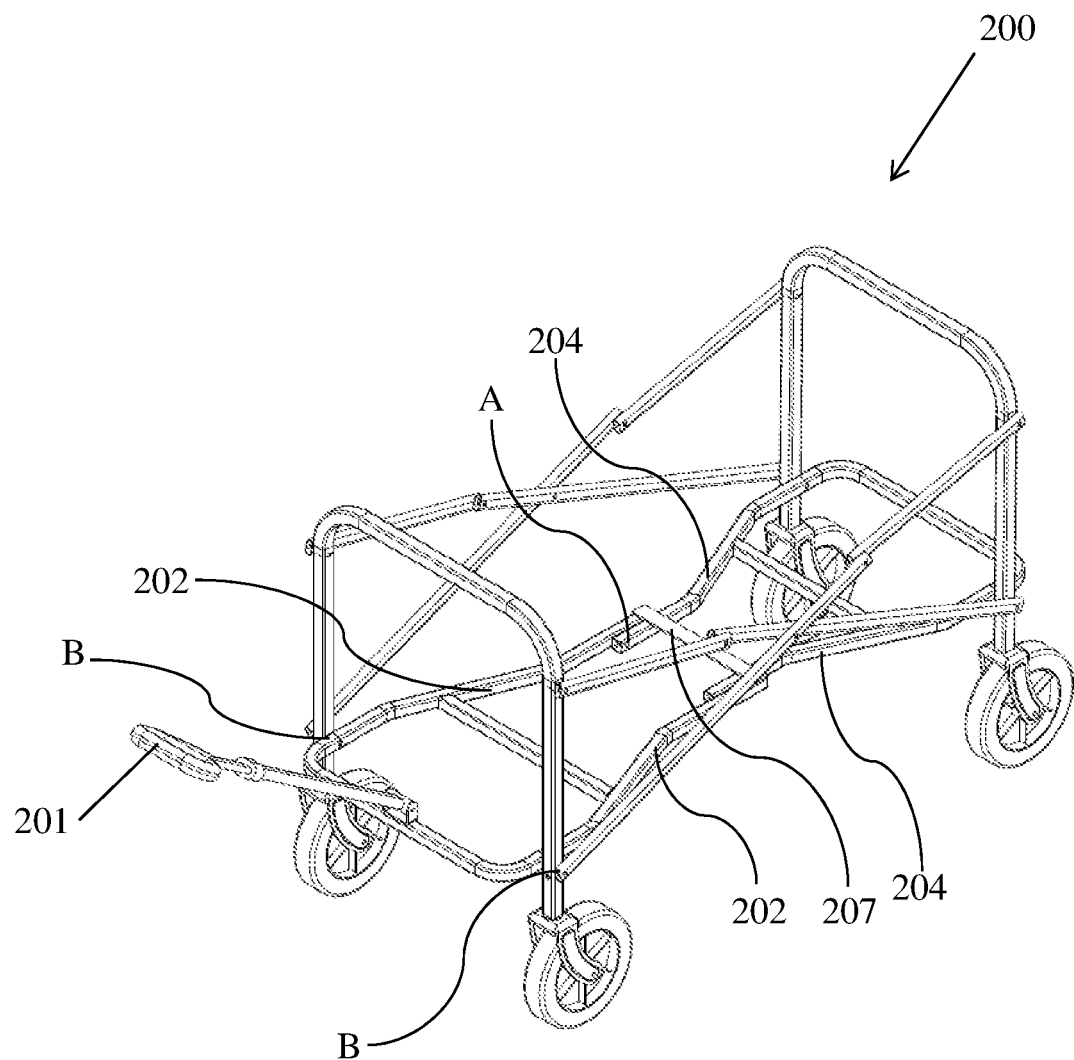
FIG. 10 is a perspective view of another embodiment of the scaffold for a folding wagon according to an aspect of the embodiment.

Another type of stopper 207 is shown in FIG. 10. Stopper 207 is an elongated flat plate connecting the two distal ends of front frame 202. Stopper 207 is disposed on a top side of the two distal ends of front frame 202. It functions similarly to the stopper 107 in FIGS. 1-3. Stopper 207 causes the pivoting range of pivot point A to be limited to no more than 180 degrees. In FIG. 10, front frame 202 and rear frame 204 forms a relatively straight and flat chassis, essentially having about 180 degrees at pivot A. The stopper 207 prevents front frame 202 to fold towards rear frame 204 on the top side of pivot A. When cargo is placed on top of pivot A, stopper 207 allows pivot A to stay relative level with pivots B and C.

Figure 11:
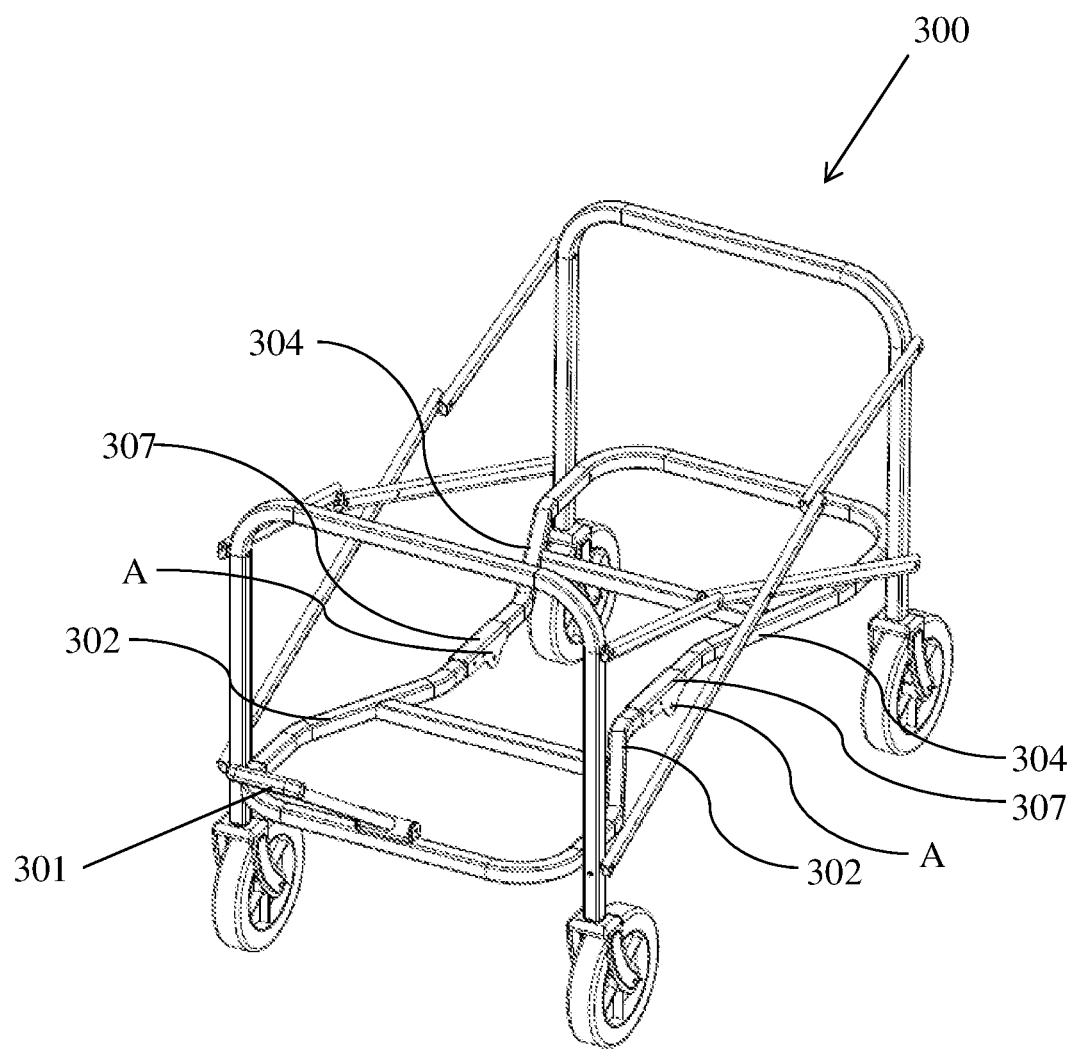
FIG. 11 is a perspective view of yet another embodiment of the scaffold for a folding wagon according to an aspect of the embodiment.
Figure 12:
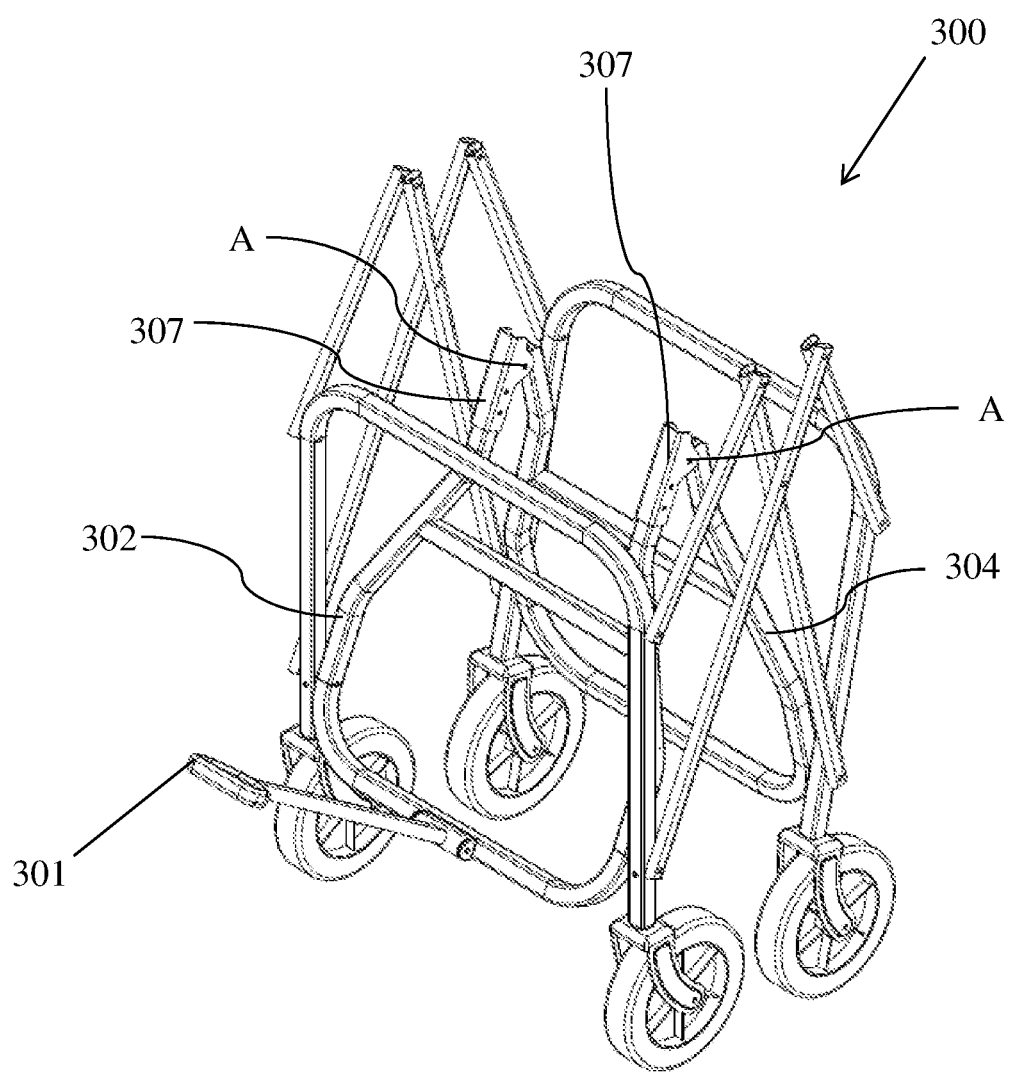
FIG. 12 is a perspective view of the embodiment of FIG. 11 being half-way folded.

Yet another type of stopper 307 is shown in FIGS. 11 and 12. Stopper 307 can be disposed about and above pivot A, and stopper 307 has a length that spans partially over the front frame 302 and the rear frame 304. When the front frame 302 and the rear frame 304 is in an expanded state, the stopper 307 abuts against the top sides of the front frame 302 and of the rear frame near pivot A. This arrangement restricts the pivoting motion of pivot A to no more than 180 degrees.

Referring back to FIG. 1, the front frame 102 and rear frame 104 can each be in a shape most appropriate for its intended cargo. They can each be a generally square shape, rectangular shape, even triangular shape. They can also each be a solid board construction creating a bottom cargo floor. In the embodiments shown, the front frame 102 and rear frame 104 can each have a generally "U" shape. The two "U" are pivotably connected at pivot A on its top end of the "U."

Both the front frame 102 and the rear frame 104 can each be anchored and pivotably attached at corresponding pivot B and pivot C. This can be achieved by providing some kind of anchoring structure for the front frame 102, for the rear frame 104, or for both.

A contemplated anchoring structure can be a structure of any size, shape, material, angle, and configuration capable of holding a shape.

In the embodiment shown in FIGS. 1-12, these anchoring structures can be a front vertical support 120 and a rear vertical support 130, each of which can have an upside down "U" shape. In the embodiment of FIG. 1, the front vertical support 120 and the rear vertical support are identical in shape and size. It should be noted that in other embodiments they may not be identical in shape and size.

In some embodiments, the front vertical support 120 cannot be folded onto itself in anyway. Similarly in some embodiments, the rear vertical support 130 cannot be folded onto itself in anyway.

The front vertical support 120 can be attached to two wheels 110, as shown in FIGS. 1-5, 10-12. In the particular embodiment shown in FIG. 8, the front vertical support 120 can have an upside down "U" configuration. Each vertical leg of the "U" are considered upright standards 122. These upright standards 122 can be connected by a horizontal brace 124, thereby forming the "U" configuration. Each of the two upright standards 122 can pivotably attach to other braces/frames of the scaffold. For example, the upright standards 122 of the front vertical support 120 is each pivotably attached to the front frame 102 at pivot points B.

Similarly, in some embodiments, the rear vertical support 130 can be attached to two wheels 110, as shown in FIGS. 1-5, 10-12. In the particular embodiment shown in FIG. 9, the rear vertical support 130 can have an upside down "U" configuration. Each vertical leg of the "U" are considered upright standards 132. These upright standards 132 can be connected by a horizontal brace 134, thereby forming the "U" configuration. Each of the two upright standards 132 can pivotably attach to other braces/frames of the scaffold. For example, the upright standards 132 of the rear vertical support 130 can each pivotably attach to the rear frame 104 at pivot points C.

This disclosure specifically covers other shapes and sizes possible for the front and rear vertical supports 120, 130. For example, the front and rear vertical supports 120, 130 may each be a solid wall structure, or a squarish frame, or other configurations, so long as it can act as an anchoring structure to which the front and rear frames are respectively attached to.

There can be additional braces disposed on each of the two lateral sides of the folding wagon 100. In a contemplated embodiment, there can be a first transverse frame 113 disposed on a lateral side of the folding wagon 100. The first transverse frame 113 can be pivotably attached to other parts of the folding wagon 100 at two different locations of the first transverse frame 113. In FIGS. 1-12, a front end the first transverse frame 113 is pivotably attached to the front vertical support 120 at pivot B. Away from the front end of the first transverse frame 113 is pivot D, where the first transverse frame 113 can be pivotably attached to a second transverse frame 114.

Similarly, the second transverse frame 114 can be pivotably attached to other parts of the folding wagon 100 at two different locations of the second transverse frame 114. In FIGS. 1-12, a rear end the second transverse frame 114 is pivotably attached to the rear vertical support 130 at pivot C. Away from the rear end of the second transverse frame 114 is pivot D, where the second transverse frame 114 can be pivotably attached to the first transverse frame 113.

In FIGS. 1-12, the first transverse frame 113 is attached to a rear extender 117. This rear extender 117 can be pivotably attached to the first transverse frame 113. The rear extender 117 affectively allows the first transverse frame 113 to span diagonally across the lateral side of the folding wagon 100, connecting the front vertical support 120 (at pivot B) to the rear vertical support 130 (at pivot F).

On the other hand, the second transverse frame 114 can be attached to a front extender 116. This front extender 116 can be pivotably attached to the second transverse frame 114. The front extender 116 affectively allows the second transverse frame 114 to span diagonally across the lateral side of the folding wagon 100, connecting the front vertical support 120 (at pivot E) to the rear vertical support 130 (at pivot C).

In one contemplated embodiment when the folding wagon 100 is in an expanded state, the first transverse frame 113 and the second transverse frame 114 criss-cross each other to form an "X" configuration.

Figure 5:
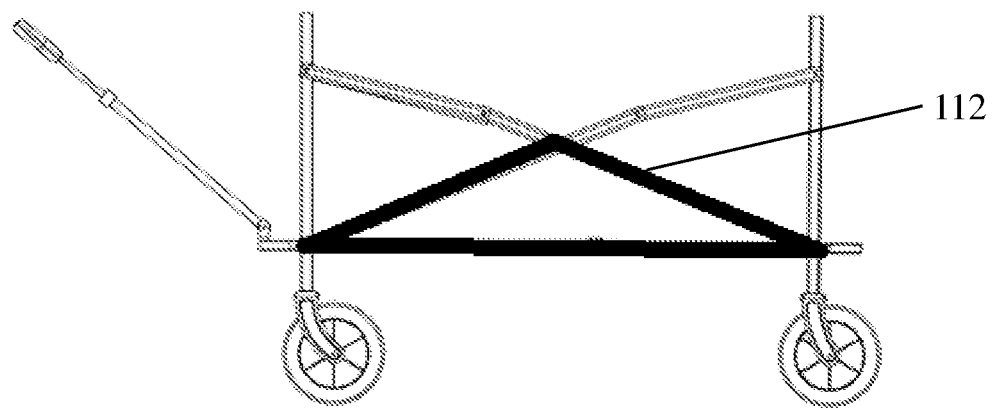
FIG. 5 is a side view of the scaffold of FIG. 1.
Figure 6:
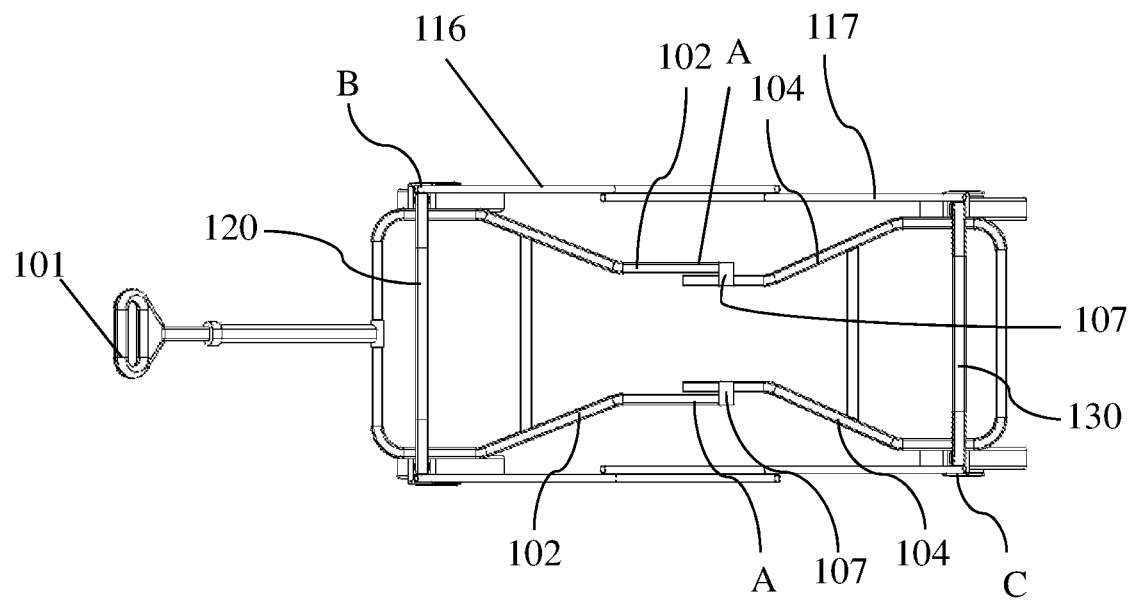
FIG. 6 is a top view of the scaffold of FIG. 1.
Figure 7:
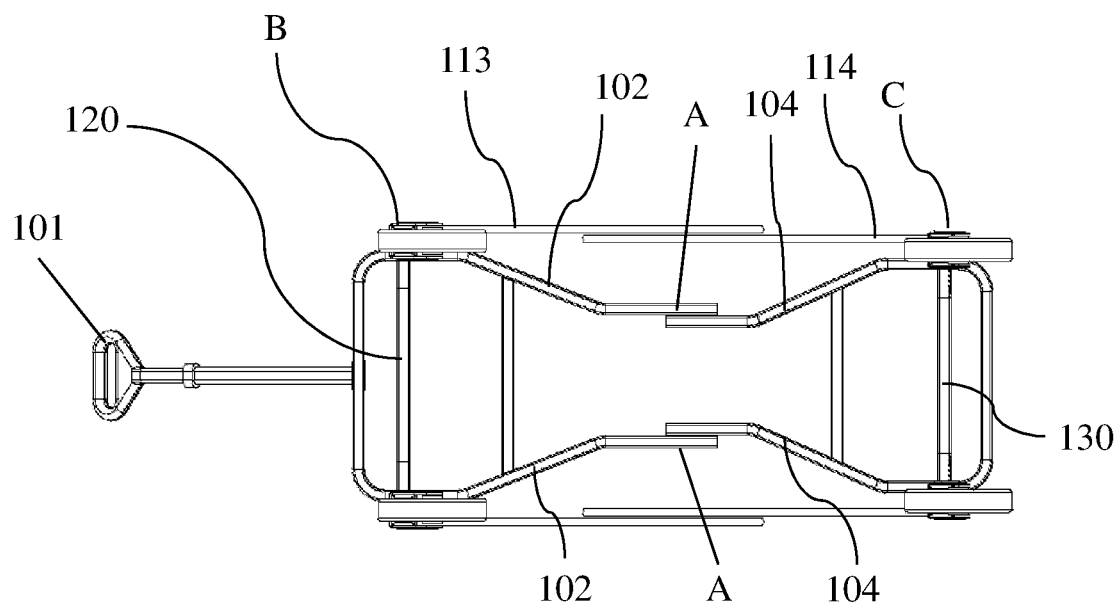
FIG. 7 is a bottom view of the scaffold of FIG. 1.
Figure 8:
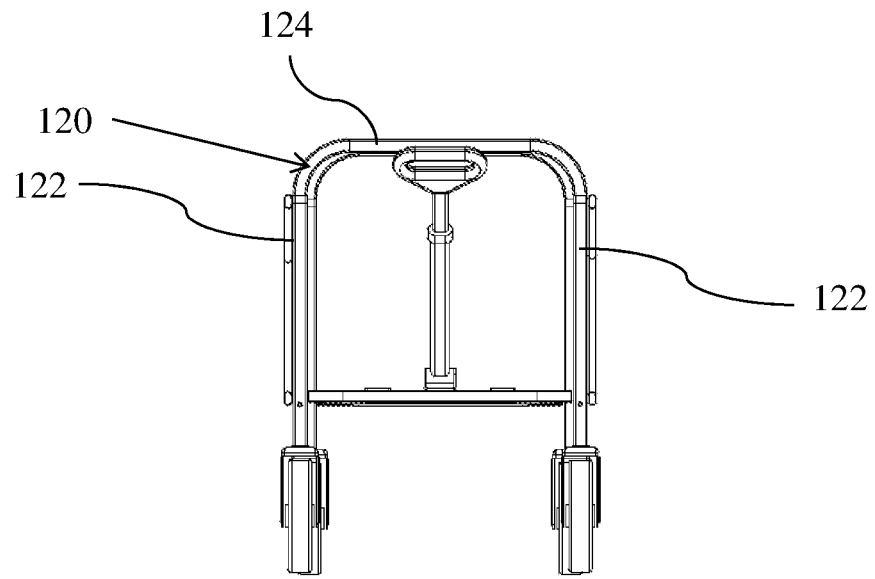
FIG. 8 is a front view of the scaffold of FIG. 1.
Figure 9:
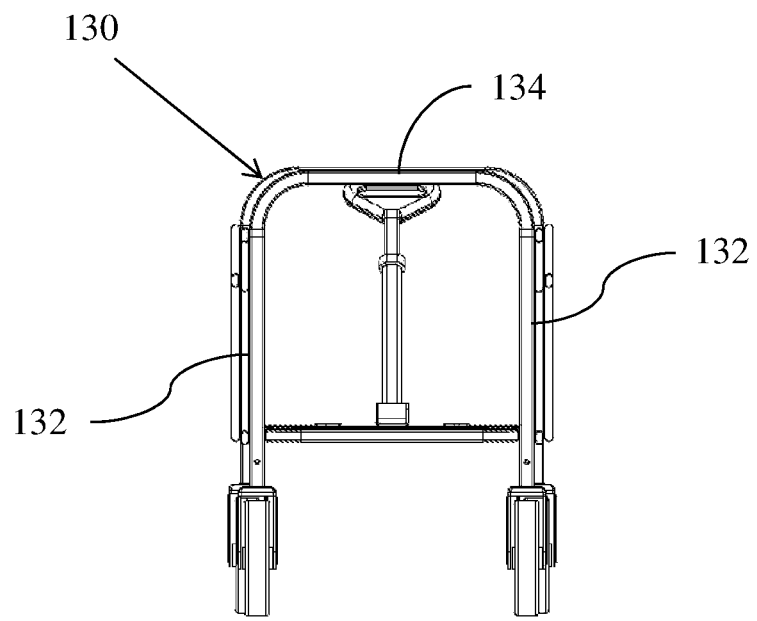
FIG. 9 is a rear view of the scaffold of FIG. 1.

In yet another contemplated embodiment when the folding wagon 100 is in an expanded state, the arrangement of the first transverse frame 113, the second transverse frame 114, the front frame and the rear frame forms an isosceles triangle 112 (FIG. 5).

In some embodiments, each of the first and second transverse frames 113, 114 can be collapsible/foldable in more than one places, allowing further collapsing where needed.

In other embodiments, each of the first and second transverse frames 113, 114 cannot be collapsible/foldable along the length between pivots A and D, and between pivots B and D, respectively. This embodiment allows for stronger integrity of the folding wagon 100.

In a contemplated configuration, during collapsing of the folding wagon 100 (e.g., FIG. 2) and when the folding wagon 100 is in a fully collapsed state (e.g., FIG. 3), the first and the second transverse frames 113, 114 remain connected to each other.

Thus, specific embodiments and applications of a folding wagon have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

What is claimed is:
1. A folding wagon comprising:
  a front frame;
  a rear frame pivotably coupled to the front frame at a pivot A;
  a handle coupled to the front frame;

a stopper coupled to either the front frame or the rear frame to restrict a pivoting movement of the front frame relative to the rear frame in at least one direction;
a plurality of wheels coupled to the front frame and/or the rear frame;
a first transverse frame pivotably coupled to the front frame at a pivot B;
a second transverse frame pivotably coupled to the rear frame at a pivot C;
a front vertical support disposed at a front end of the folding wagon;
a rear vertical support disposed at a rear end of the folding wagon; and
wherein the pivot B is disposed on the front vertical support and the pivot C is disposed on the rear vertical support;
wherein the front frame is pivotably coupled to the front vertical support and the rear frame is pivotably coupled to the rear vertical support;
wherein the first transverse frame is pivotably coupled to the second transverse frame at a pivot D; and
wherein
  a) the front frame has a left bar and a right bar parallel to each other, the left bar has a first extension extending forwardly beyond the pivot B, and the right bar has a second extension extending forwardly beyond the pivot B, the first extension and the second extension are connected by a front lever foot pedal bar which has a length substantially equal to a width of the front frame and is disposed perpendicular to a longitudinal axis of the foldable wagon, and/or
  b) the rear frame has a left bar and a right bar parallel to each other, the left bar has a third extension extending rearwardly beyond the pivot C, and the right bar has a fourth extension extending rearwardly beyond the pivot C, the third extension and the fourth extension are connected by a rear lever foot pedal bar which has a length substantially equal to a width of the rear frame and is disposed perpendicular to a longitudinal axis of the foldable wagon.

2. The folding wagon as recited in claim 1, where the front frame and the rear frame are disposed under a cargo area of the wagon.

3. The folding wagon as recited in claim 1, wherein the first transverse frame is unfoldable along a length between pivot B and pivot D, and the second transverse frame is unfoldable along a length between pivot C and pivot D.

4. The folding wagon as recited in claim 1, wherein the first transverse frame is coupled to the rear vertical support at a pivot F via a rear extender which is pivotably coupled to the first transverse frame, and the second transverse frame is coupled to the front vertical support at a pivot E via a front extender which is pivotably coupled to the second transverse frame.

5. The folding wagon as recited in claim 1, wherein the front frame is unfoldable along a length between pivot B and pivot A, and wherein the rear frame is unfoldable along a length between pivot A and pivot C.

6. A folding wagon comprising:
a front frame disposed below a cargo region;
a rear frame pivotably coupled to the front frame at pivot A;
a front vertical support pivotably coupled to the front frame at pivot B;
a rear vertical support pivotably coupled to the rear frame at pivot C;
a first transverse frame disposed on a lateral side of the wagon coupling the front vertical support to the rear vertical support;
a first and a second wheels attached to a bottom of the front frame;
a third and a fourth wheels attached to a bottom of the rear frame;
a handle bar pivotably coupled to the front frame; and
wherein
  a) the front frame has a left bar and a right bar parallel to each other, the left bar has a first extension extending forwardly beyond the pivot B, and the right bar has a second extension extending forwardly beyond the pivot B, the first extension and the second extension are connected by a front lever foot pedal bar which has a length substantially equal to a width of the front frame and is disposed perpendicular to a longitudinal axis of the foldable wagon, and/or
  b) the rear frame has a left bar and a right bar parallel to each other, the left bar has a third extension extending rearwardly beyond the pivot C, and the right bar has a fourth extension extending rearwardly beyond the pivot C, the third extension and the fourth extension are connected by a rear lever foot pedal bar which has a length substantially equal to a width of the rear frame and is disposed perpendicular to a longitudinal axis of the foldable wagon.

7. The folding wagon as recited in claim 6 further comprising a front extender pivotably attached to the first transverse frame, allowing a continuous connection between the front vertical support and the rear vertical support.

8. The folding wagon as recited in claim 7 further comprising a second transverse frame disposed on the lateral side coupling the front vertical support to the rear vertical support.

9. The folding wagon as recited in claim 8, wherein the first transverse frame is pivotably connected to the second transverse frame, forming an X configuration when the folding wagon is in an expanded state.

10. A scaffold for a folding wagon, the scaffold comprising:
a front frame pivotably coupled to a rear frame at a pivot A having a range of pivoting motion of no greater than 180 degrees;
a first transverse frame pivotably coupled to the front frame;
a second transverse frame pivotably coupled to the rear frame;
wherein the first transverse frame is pivotably coupled to the second transverse frame at pivot D, and in an expanded state, both the first transverse frame and the second transverse frame are diagonally disposed on a side of the wagon;
wherein in an expanded state, the front frame and the rear frame creates a straight and flat bottom frame, and from a side view the first and second transverse frames becomes two equal sides of an isosceles triangle while the straight and flat bottom frame become the bottom side of the isosceles triangle; and
wherein
  a) the front frame has a left bar and a right bar parallel to each other, the left bar has a first extension extending forwardly beyond the pivot B, and the right bar has a second extension extending forwardly beyond the pivot B, the first extension and the second extension are connected by a front lever foot pedal bar which has a length substantially equal to a width of the front frame and is disposed perpendicular to a longitudinal axis of the foldable wagon, and/or b) the rear frame has a left bar and a right bar parallel to each other, the left bar has a third extension extending rearwardly beyond the pivot C, and the right bar has a fourth extension extending rearwardly beyond the pivot C, the third extension and the fourth extension are connected by a rear lever foot pedal bar which has a length substantially equal to a width of the rear frame and is disposed perpendicular to a longitudinal axis of the foldable wagon.

11. The scaffold as recited in claim 10, wherein the front frame is pivotable around a pivot B near a front end of the wagon, wherein a downward biasing force applied on either the front lever foot pedal bar or the rear lever foot pedal bar causes the straight and flat bottom frame to fold and collapse.

12. The scaffold as recited in claim 10, wherein the front frame is pivotable around a pivot B near a front end of the wagon, wherein a downward biasing force applied on either the front lever foot pedal bar or the rear lever foot pedal bar causes the pivot A to elevate higher than pivot B, and decreases a bottom angle of pivot A.

13. The scaffold as recited in claim 10 further comprising a front vertical support pivotably coupled to the front frame at a pivot B, and a rear vertical support pivotably coupled to the rear frame at a pivot C.

14. The scaffold as recited in claim 13, wherein the first transverse frame has a first end coupled to the front vertical support and a second end coupled to the rear vertical support via a rear extender.

15. The scaffold as recite claim 14 further comprising a handle bar having an end pivotably coupled to a front end of the front frame.

* * * * *